(12) United States Patent
Hsu

(10) Patent No.: US 10,852,787 B2
(45) Date of Patent: Dec. 1, 2020

(54) SLOT MODULE AND ELECTRONIC DEVICE USING THE SLOT MODULE

(71) Applicant: PEGATRON CORPORATION, Taipei (TW)

(72) Inventor: Chun-Tang Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/444,968

(22) Filed: Jun. 18, 2019

(65) Prior Publication Data

US 2019/0384365 A1 Dec. 19, 2019

(30) Foreign Application Priority Data

Jun. 19, 2018 (TW) ............................. 107120952 A

(51) Int. Cl.
| | | |
|---|---|---|
| G06F 1/20 | (2006.01) | |
| G06F 1/18 | (2006.01) | |
| G11B 33/12 | (2006.01) | |
| F16C 11/04 | (2006.01) | |
| H05K 5/02 | (2006.01) | |
| G06F 1/16 | (2006.01) | |
| G11B 33/14 | (2006.01) | |

(52) U.S. Cl.
CPC ............... *G06F 1/20* (2013.01); *F16C 11/04* (2013.01); *G06F 1/1613* (2013.01); *G06F 1/183* (2013.01); *G11B 33/123* (2013.01); *G11B 33/1426* (2013.01); *H05K 5/02* (2013.01)

(58) Field of Classification Search
CPC ................................ G06F 1/1658; G06F 1/187
See application file for complete search history.

(56) References Cited

U.S. PATENT DOCUMENTS 5,841,640 A * 11/1998 Shibata ................ H05K 7/1023
361/820
10,111,365 B1 * 10/2018 Junkins ................ H05K 7/1487

FOREIGN PATENT DOCUMENTS

| TW | M331731 | 5/2008 |
| TW | I487469 | 6/2015 |
| TW | I550603 | 9/2016 |

* cited by examiner

*Primary Examiner* — Mukundbhai G Patel
(74) *Attorney, Agent, or Firm* — J.C. Patents

(57) ABSTRACT

A slot module and an electronic device using the same are provided. The slot module includes a base, a slot member, a heat sink and a position limiting member. One end of the slot member is pivotally connected to the base, such that the slot member is adapted to rotate relative to the base, and a functional element is adapted to be inserted into the slot member. The heat sink and the position limiting member are all disposed on the base, wherein the position limiting member is adapted to be rotated from a first position to a second position to buckle the slot member, such that the functional component inserted into the slot member contacts the heat sink.

8 Claims, 3 Drawing Sheets

US 10,852,787 B2

SLOT MODULE AND ELECTRONIC DEVICE USING THE SLOT MODULE

CROSS-REFERENCE TO RELATED APPLICATION

This application claims the priority benefit of Taiwan application serial no. 107120952, filed on Jun. 19, 2018. The entirety of the above-mentioned patent application is hereby incorporated by reference herein and made a part of this specification.

BACKGROUND

Technical Field

The disclosure relates to a slot module and an electronic device using the slot module.

Description of Related Art

Due to limitation of a size and component configuration positions of an electronic device, it is difficult to install a heat sink for a removable functional component (for example, a solid state disk) installed in the electronic device, so that only natural convection is usually used for heat dissipation.

However, the heat produced during the operation of the functional component may be accumulated around and cannot be effectively dissipated, which not only influences the operation of the functional component, but may also influence operations of other components disposed around the functional component.

SUMMARY

The disclosure is directed to a slot module capable of effectively dissipating heat and an electronic device using the slot module.

The disclosure provides a slot module including a base, a slot member, a heat sink and a position limiting member. The slot member has one end and the end is pivotally connected to the base, such that the slot member is adapted to rotate relative to the base, and the functional component is adapted to be inserted into the slot member. The heat sink and the position limiting member are disposed on the base, wherein the position limiting member is adapted to rotate from a first position to a second position relative to the base to buckle the slot member, such that the functional component inserted into the slot member contacts the heat sink.

The disclosure provides an electronic device including a housing, a functional component and a slot module, wherein the slot module is assembled in internal of the housing, and the functional component is assembled to the slot module. The slot module includes a base, a slot member, a heat sink and a position limiting member. The slot member has one end and the end is pivotally connected to the base, such that the slot member is adapted to rotate relative to the base, and the functional component is adapted to be inserted into the slot member. The heat sink and the position limiting member are disposed on the base, wherein the position limiting member is adapted to rotate from a first position to a second position relative to the base to buckle the slot member, such that the functional component inserted into the slot member contacts the heat sink.

In an embodiment of the disclosure, the position limiting member is further located at an entrance of the slot member, and is configured to limit a position of the functional component in the slot member.

In an embodiment of the disclosure, the position limiting member includes a pivot portion, a hook portion and a jacking portion, where the pivot portion is pivotally connected to the base, and the pivot portion is connected between the hook portion and the jacking portion, the jacking portion jacks up the slot member when the position limiting member is located at the first position, and the hook portion buckles the slot member when the position limiting member is rotated to the second position relative to the base.

In an embodiment of the disclosure, the slot module further includes a pivot, one end of the slot member is pivotally connected to the base through the pivot, and the pivot portion is a spring hinge.

In an embodiment of the disclosure, the slot module further includes a first connector and the functional component further includes a second connector, the first connector is disposed in the slot member, and the first connector and the second connector are interconnected when the functional component is inserted into the slot member.

Based on the above description, in the slot module and the electronic device applying the slot module, the pivot portion is connected between the base and the slot member, so that the slot member may be rotated relative to the base to contact the heat sink disposed on the base, so as to improve a heat dissipation effect through conduction.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
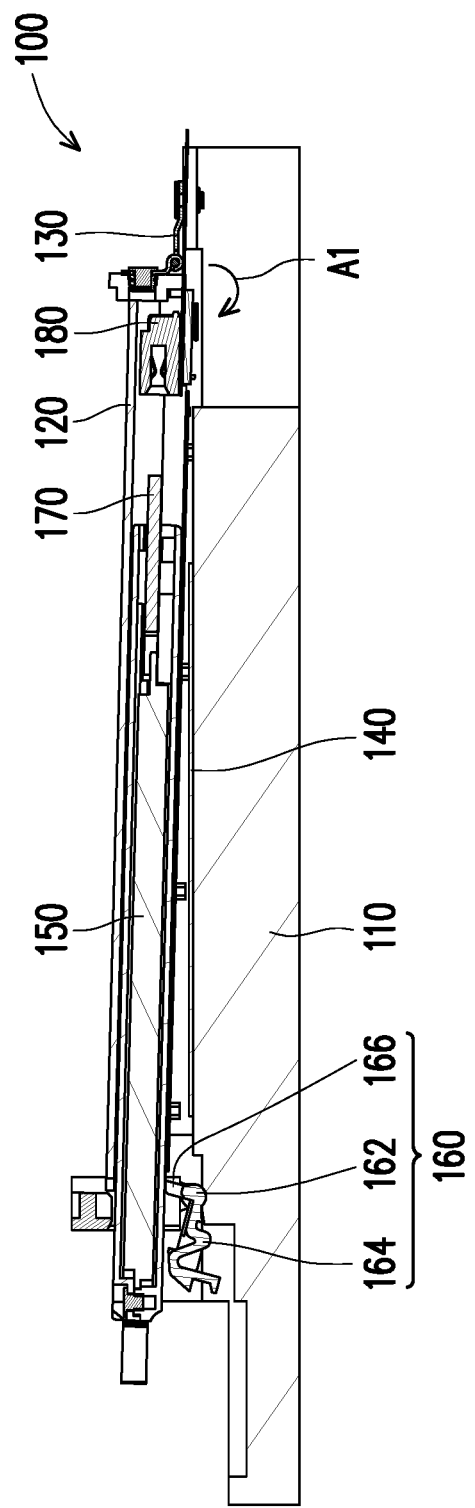
FIG. 1 is a schematic diagram of a slot module.

FIG. 1 is a schematic diagram of a slot module. Referring to FIG. 1, the slot module 100 includes a base 110, a slot member 120, a heat sink 140 and a position limiting member 160. One end of the slot member 120 is pivotally connected to the base 110 through a pivot 130, such that the slot member 120 is adapted to rotate relative to the base 110 through the pivot 130. The heat sink 140 is disposed on the base 110, and the position limiting member 160 is disposed on the base 110 to limit a position of the slot member 120.

Figure 2:
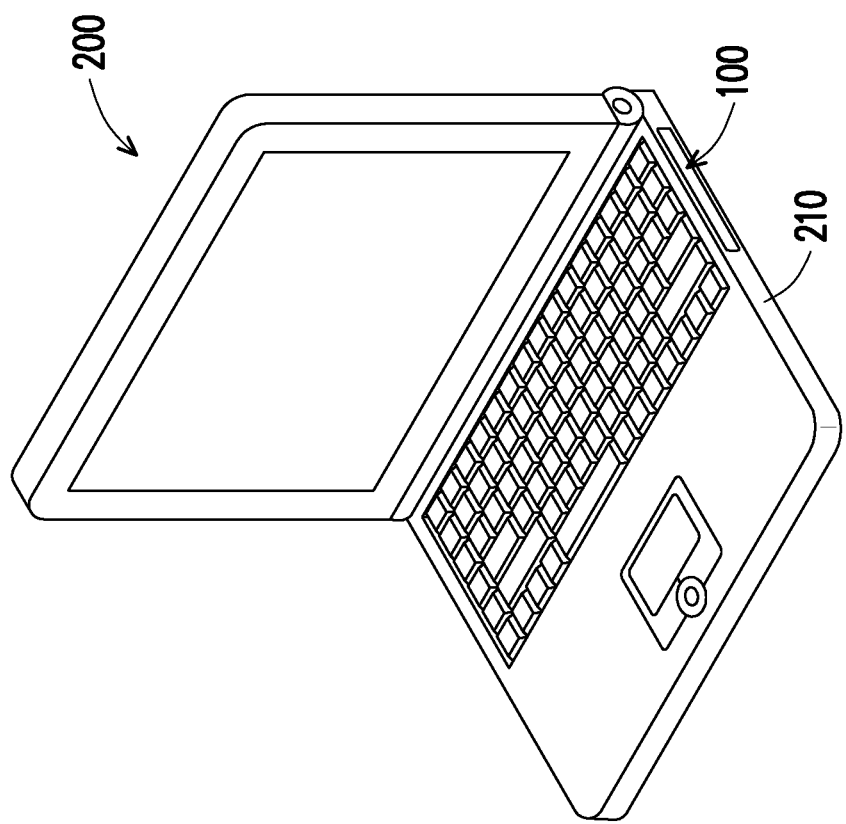
FIG. 2 is a schematic diagram of an electronic device applying the slot module of FIG. 1.

FIG. 2 is a schematic diagram of an electronic device applying the slot module of FIG. 1. Referring to FIG. 1 and FIG. 2, the slot module 100 may be applied to the electronic device 200, wherein the electronic device 200 may be a notebook computer, an AIO computer or other possible electronic devices. The electronic device 200 includes a housing 210, and the slot module 100 is assembled in internal of the housing 210, where the base 110 may be a part of the housing 210 of the electronic device 200, or the base 110 may be a component additionally disposed in internal of the housing 210, which is determined according to an actual requirement. A functional component 150 is inserted into the slot member 120 of the slot module 100, and contacts the heat sink 140.

The functional component 150 may be a solid state disk, a hard disk or a compact disk drive, etc., that may be inserted into the slot member 120 or pulled out of the slot member 120, and the slot module 100 further includes a first connector 180 disposed in the slot member 120 and a second connector 170 disposed in the functional component 150, wherein the first connector 180 may be electrically connected to a circuit board (not shown) disposed in internal of the housing 210 of the electronic device 200 through a cable or other manners, so that after the functional component 150 is inserted into the slot member 120, the first connector 180 and the second connector 170 are interconnected, and the functional component 150 may be electrically connected to the circuit board (not shown) of the electronic device 200.

Moreover, the pivot 130 used for connecting the base 110 and the one end of the slot member 120 may be implemented by a spring hinge, and the spring hinge may provide an elastic restoring force to drive the slot member 120 to rotate relative to the base 110.

The position limiting member 160 includes a pivot portion 162, a hook portion 164 and jacking portion 166, wherein the pivot portion 162 connected between the hook portion 164 and the jacking portion 166 is pivotally connected to the base 110, the jacking portion 166 is located under the slot member 120, and the position limiting member 160 may be rotated between a first position and a second position while taking the pivot portion 160 as a rotation axis.

As shown in FIG. 1, when the functional component 150 is to be inserted into the slot member 120, the elastic restoring force provided by the pivot 130 implemented by the spring hinge makes the slot member 120 to rotate upward relative to the base 110, which is shown as an arrow A1 representing a rotation direction. When the position limiting member 160 is rotated to the first position while taking the pivot portion 162 as the rotation axis, the jacking portion 166 of the position limiting member 160 jacks up the slot member 120, and while the jacking portion 166 jacks up the slot member 120, the slot member 120 is rotated upwards relative to the base 110 through the pivot 130, which facilitates the user to insert the functional component 150 into the slot member 120, and the first connector 180 and the second connector 170 are interconnected for electrical connection (as shown in FIG. 3).

Figure 3:
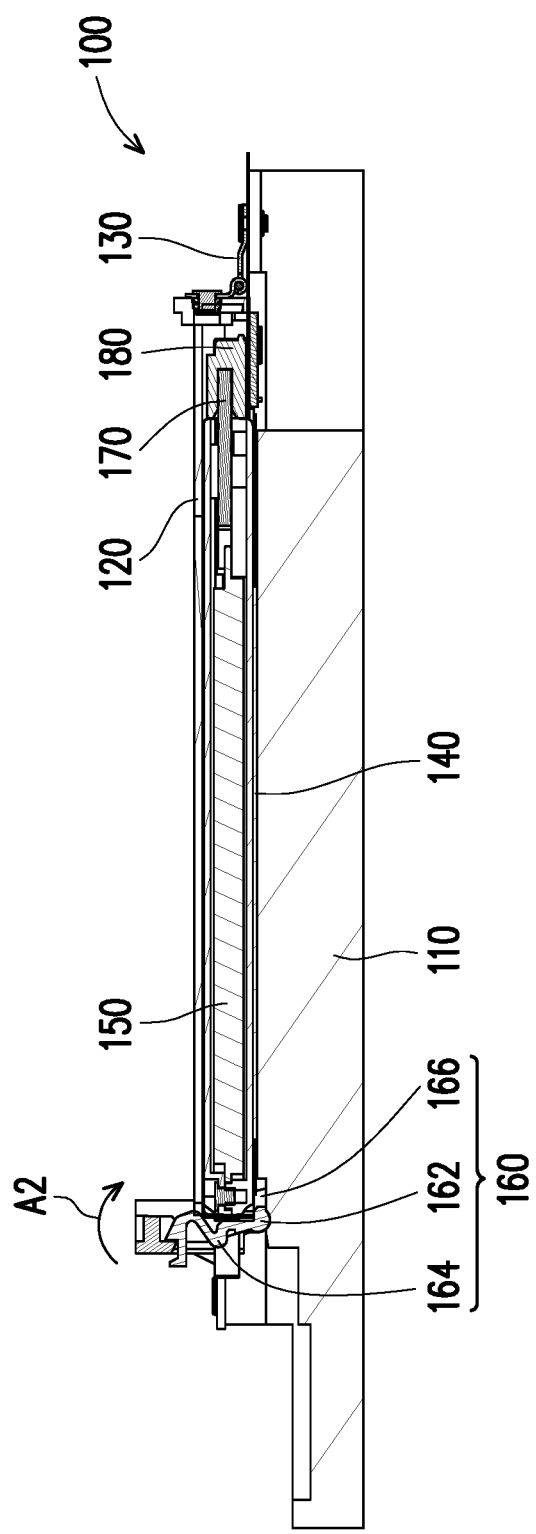
FIG. 3 is a schematic diagram of the slot module when the position limiting member is rotated to the second position.

FIG. 3 is a schematic diagram of the slot module when the position limiting member is rotated to the second position. Referring to FIG. 3, after the functional component 150 is inserted into the slot member 120, the rotation limiting member 160 is rotated, so that the position limiting member 160 is rotated from the first position to the second position relative to the base 110. As the jacking portion 166 is rotated downward, shown as an arrow A2 representing a rotation direction, the slot member 120 is also rotated relative towards the base 110 through the pivot 130 to contact the heat sink 140 disposed on the base 110, where the heat sink 140 may be a cooling plate, cooling fins, a heat pipe, or a combination thereof, which is determined according to an actual requirement.

After the position limiting member 160 is rotated to the second position, the hook portion 164 of the position limiting member 160 buckles the slot member 120 to fix the slot member 120 relative to the base 110.

It should be noted that a bottom of the slot member 120 may be hollowed out, so as to reduce a whole weight of the slot module 100. In this case, the bottom of the functional component 150 directly contacts the heat sink 140 to achieve the heat dissipation effect.

Alternatively, the bottom of the slot member 120 may also be a metal sheet, and the bottom of the functional component 150 may directly contact the metal sheet, and the metal sheet contacts the heat sink 140, so that the functional component 150 may have a good heat dissipation effect through conduction.

According to the above description, the position limiting member 160 may be further disposed at an entrance of the slot member 120, and so as to limit the position of the functional component 150 in the slot member 120.

In summary, in the slot module of the present invention, the slot member may be lifted relative to the base through the pivot, so as to facilitate the user inserting the removable functional component into the slot member, and after the functional component is inserted into the slot member, the slot member may be rotated to approach the base and contact the heat sink disposed on the base, so as to effectively dissipate the heat generated by the functional component. Compared to the functional component of the conventional electronic device, which may only dissipate heat through natural convection, the electronic device using the slot module of the invention may provide a better heat dissipation effect to the functional component.

Moreover, by rotating the position limiting member, the leaning portion of the position limiting member may jack up the slot member or make the slot member to rotate close to the base, and the hook portion of the position limiting member may be exactly buckled to the slot member, by which not only the bottom of the slot member (or the bottom of the functional component) is ensured to contact the heat sink, but also the functional components is prevented from falling out of the slot member.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A slot module, wherein a functional component is adapted to be assembled to the slot module, the slot module comprising:

a base;

a slot member, having one end pivotally connected to the base, such that the slot member is adapted to rotate relative to the base, and the functional component is adapted to be inserted into the slot member;

a heat sink, disposed on the base; and a position limiting member, disposed on the base, and adapted to rotate from a first position to a second position relative to the base to buckle the slot member, such that the functional component inserted into the slot member contacts the heat sink, wherein the position limiting member comprises:

a pivot portion, pivotally connected to the base;

a hook portion; and a jacking portion, wherein the pivot portion is connected between the hook portion and the jacking portion, the jacking portion jacks up the slot member when the position limiting member is located at the first position, and the hook portion buckles the slot member when the position limiting member is rotated to the second position relative to the base.

2. The slot module as claimed in claim 1, wherein the position limiting member is further located at an entrance of the slot member, and is configured to limit a position of the functional component in the slot member.

3. The slot module as claimed in claim 1, further comprising a pivot, one end of the slot member is pivotally connected to the base through the pivot, and wherein the pivot portion is a spring hinge.

4. The slot module as claimed in claim 1, wherein the functional component further comprises a second connector, and the slot module comprises a first connector, wherein the first connector is disposed in the slot member, and the first connector and the second connector are interconnected when the functional component is inserted into the slot member.

5. An electronic device, comprising:
   a housing;
   a functional component;
   a slot module, assembled in internal of the housing, the functional component being assembled to the slot module, and the slot module comprising:
   a base;
   a slot member, having one end pivotally connected to the base, such that the slot member is adapted to rotate relative to the base, and the functional component is adapted to be inserted into the slot member;
   a heat sink, dispose on the base; and
   a position limiting member, disposed on the base, and adapted to rotate from a first position to a second position relative to the base to buckle the slot member, such that the functional component inserted into the slot member contacts the heat sink,
   wherein the position limiting member comprises:
      a pivot portion, pivotally connected to the base;
      a hook portion; and
      a jacking portion, wherein the pivot portion is connected between the hook portion and the jacking portion, the jacking portion jacks up the slot member when the position limiting member is located at the first position, and the hook portion buckles the slot member when the position limiting member is rotated to the second position relative to the base.

6. The electronic device as claimed in claim 5, wherein the position limiting member is further located at an entrance of the slot member, and is configured to limit a position of the functional component in the slot member.

7. The electronic device as claimed in claim 5, wherein the slot module further comprises a pivot, one end of the slot member is pivotally connected to the base through the pivot, and the pivot portion is a spring hinge.

8. The electronic device as claimed in claim 5, wherein the functional component further comprises a second connector, and the slot module comprises a first connector, wherein the first connector is disposed in the slot member, and the first connector and the second connector are interconnected when the functional component is inserted into the slot member.

* * * * *